United States Patent [19]
Sukow et al.

[11] Patent Number: 5,256,910
[45] Date of Patent: Oct. 26, 1993

[54] MONITORING APPARATUS

[76] Inventors: William E. Sukow, 13216 Birchwood La., Burnsville, Minn. 55337; Peter Beagan, 1870 Eagle Ridge Dr., #6, Mendota Heights, Minn. 55118; Dennis D. Ikola, 2866 Lakeshore Ave., Maple Plain, Minn. 55359; Troy D. Nelson, 3850 Plymouth Blvd., No. 124, Plymouth, Minn. 55446

[21] Appl. No.: 793,465

[22] Filed: Nov. 18, 1991

[51] Int. Cl.$^5$ .................................................. H02J 4/00
[52] U.S. Cl. ..................................... 307/125; 307/10.1; 324/378
[58] Field of Search .................. 307/9.1, 10.1, 112, 307/125; 324/378

[56] References Cited

U.S. PATENT DOCUMENTS

| | | | |
|---|---|---|---|
| 4,572,963 | 2/1986 | Nakano et al. | 307/10.1 |
| 4,760,275 | 7/1988 | Sato et al. | 307/10.1 |
| 4,942,571 | 7/1990 | Möller et al. | 307/10.1 |

Primary Examiner—Jeffrey A. Gaffin
Attorney, Agent, or Firm—Donald A. Jacobson

[57] ABSTRACT

A monitoring apparatus, which reads a number of internal combustion engine temperatures and engine revolutions per minute, displays either a current or a peak reading of one of these parameters using a digital readout. Transducers convert the various physical parameters to analog voltages. A digital potentiometer, comparator and logic circuitry are used to step the potentiometer output to a greater value only to equal the highest input voltage. This stores the peak voltage for that parameter in analog form. Each parameter has this equipment, which results in all of the parameters having the peak value tracked simultaneously. A multiplexer selects one of the parameters, either peak or current. This selected parameter is then converted by an analog to digital converter to a set of four binary coded decimal numbers. These numbers are then displayed on a liquid crystal display. A unique control arrangement allows a single spring loaded switch to either toggle the readout between the peak or current values, when it is held closed for four seconds, or to step the multiplexer through the various parameters when it is closed momentarily.

11 Claims, 6 Drawing Sheets

MONITORING APPARATUS

FIELD OF THE INVENTION

This invention relates to a monitoring device to monitor and display either the current or the peak value of a number of internal combustion engine parameters.

BACKGROUND OF THE INVENTION

A number of current devices provide monitoring and display capabilities of current and peak values of internal combustion engine parameters by using a microprocessor with digital storage of the monitored data in digital memory cells. The data is then called from memory and displayed.

The instant invention eliminates the microprocessor with its attendant timing, programming and environmental requirements, and instead uses only analog and digital logic elements. These logic elements have much less critical and slower timing requirements, need no programming, and have considerably wider environmental tolerances.

SUMMARY OF THE INVENTION

This apparatus monitors the real (current) values, or the peak (stored) values of a number of internal combustion engine parameters. The primary contemplated use of this apparatus is to obtain peak performance from a high performance automobile racing engine, by monitoring the real values of the engine parameters during a performance test, and reading the peak values of these same parameters at the end of the test to obtain information in order to optimize the engine performance.

The parameters monitored include engine rpm, and three temperatures of such quantities as oil temperature, cooling water temperature, exhaust gas temperature, transmission fluid temperature and differential fluid temperature. If required, additional quantities can be read and stored. A direct current voltage, proportional to the quantity being read, is obtained for each quantity using appropriate sensors and converters. These readings are offset and expanded to better cover the range of interest. Each of these voltages are input to a separate digital potentiometer having 99 discrete voltage steps in this preferred embodiment, however 256 steps are available if that resolution is needed. The digital potentiometer outputs are each compared with the real value for that particular quantity and the potentiometer driven to equality in the positive direction only. This results in the digital potentiometer effectively storing the peak value of the quantity. The use of separate digital potentiometers for each quantity being read allows incrementing all of the digital potentiometers simultaneously to avoid any offset time between stored peak values.

During a timed power-up sequence all digital potentiometers are driven to their lowest setting. After this power-up time out, the digital potentiometers are then switched to drive upward only to store the peak values.

Both the real and peak values of all quantities are used as inputs for a multiplexer. The apparatus has two reading modes, one where only the real quantities are read, and the other where only the peak quantities are read. Either of two normally open spring-loaded switches are used to select both the reading mode and the individual input quantity. One switch is located on the monitor panel and a second switch, which is optional, is mounted on the vehicle steering wheel for operator convenience during test. This selection is obtained using only one of these switches by a first switching circuit, which will switch whenever either switch is closed, even if only momentarily, and a second switching circuit which will switch only after either switch has been closed for at least four seconds. Every time a switch is momentarily closed, the first switching circuit will switch the multiplexer input from one input quantity to the next. Every time a switch is held closed for at least four seconds, the second switching circuit will switch the multiplexer inputs from either the real quantities to the peak quantities or vice versa. The digital potentiometers increment signal, here in the form of a clock, is inhibited when the peak reading mode is selected, so none of the digital potentiometers will change value when the peak reading mode is selected. This results in all of the digital potentiometers retaining the peak readings existing at the instant the peak reading mode is selected.

The individual input quantities, whether real or peak, being read by the multiplexer are indicated by dual red and green indicating diodes which are adjacent to identifying labels naming the various quantities. When real quantities are being read the diode adjacent to the indicated quantity glows green, and when peak quantities are being read the diode glows red.

The multiplexer output is converted to a four digit binary coded decimal number by an analog to digital converter. This number, along with a decimal point, is displayed on a conventional seven segment four digit liquid crystal display (LCD).

The real reading mode is automatically selected after the timed power-up. In the usual sequence of operation during an engine test run, the operator will then simply switch from quantity to quantity, using momentary switch closures of the wheel mounted switch, to monitor all the real engine parameters. Immediately after the test run the operator will then close the monitor mounted switch for at least four seconds to switch the reading mode from the real reading mode to the peak reading mode. The operator will then read all the peak quantities existing at the time the reading mode was switched by momentary closures of the monitor mounted switch.

DETAILED DESCRIPTION OF THE PREFERRED EMBODIMENT

Figure 1:
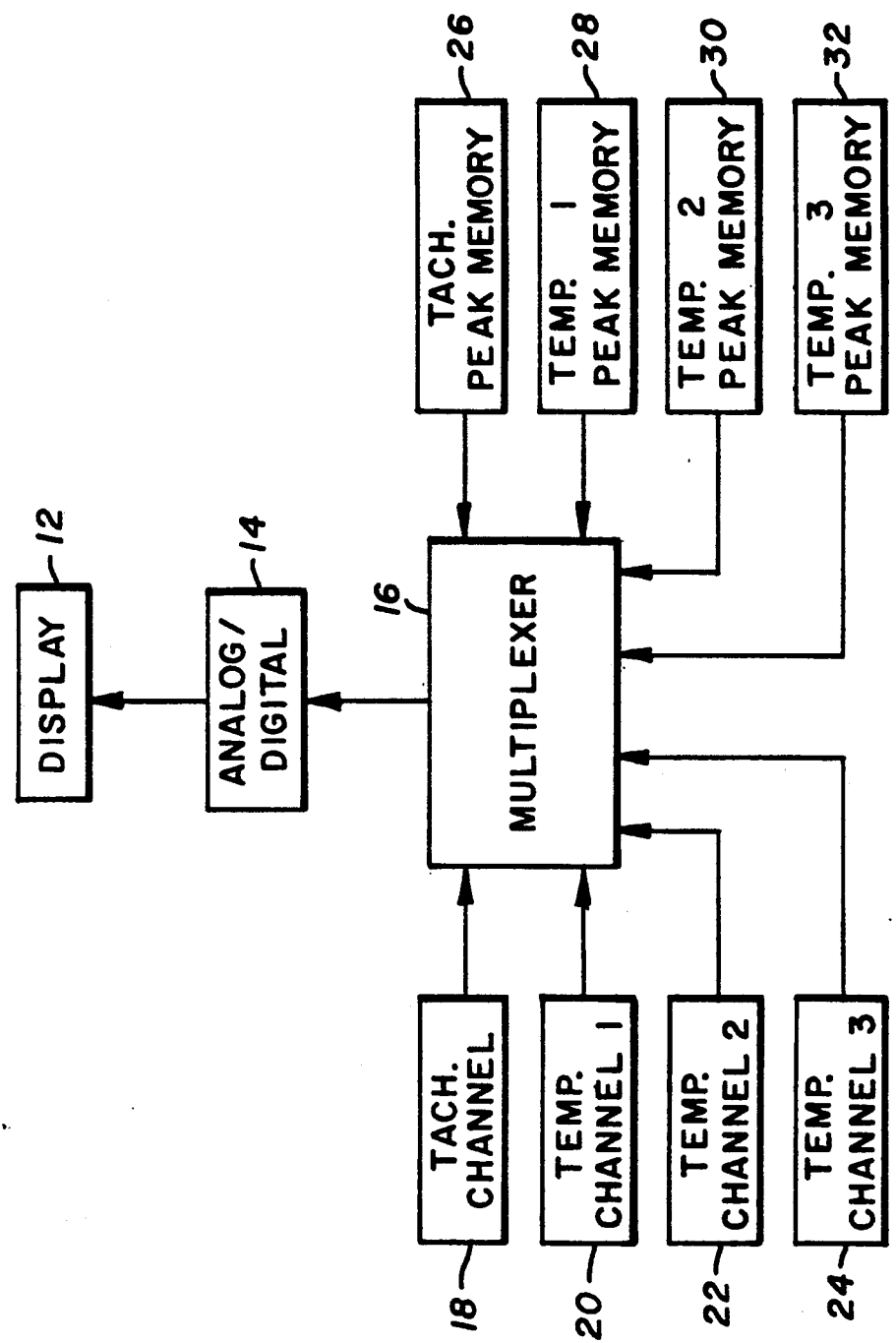
FIG. 1 is a block diagram of the apparatus.

The overall monitor circuit is shown in block diagram form in FIG. 1. The monitor results are shown on display 12. An analog to digital converter 14 is fed from multiplexer 16. The real time inputs to multiplexer 16 are tachometer (tach.) channel 18, temperature (temp.) channel one 20, temp. channel two 22, and temp. channel three 24. The peak inputs are tach. peak 26, temp. one peak 28, temp. two peak 30, and temp. three peak 32.

The input channels collect and provide data in analog voltage form to multiplexer 16. Multiplexer 16 selects one channel and connects that channel to analog to digital converter 14. This analog voltage is converted to a digital number displayed in numeric form to the user by the display 12.

Figure 9:
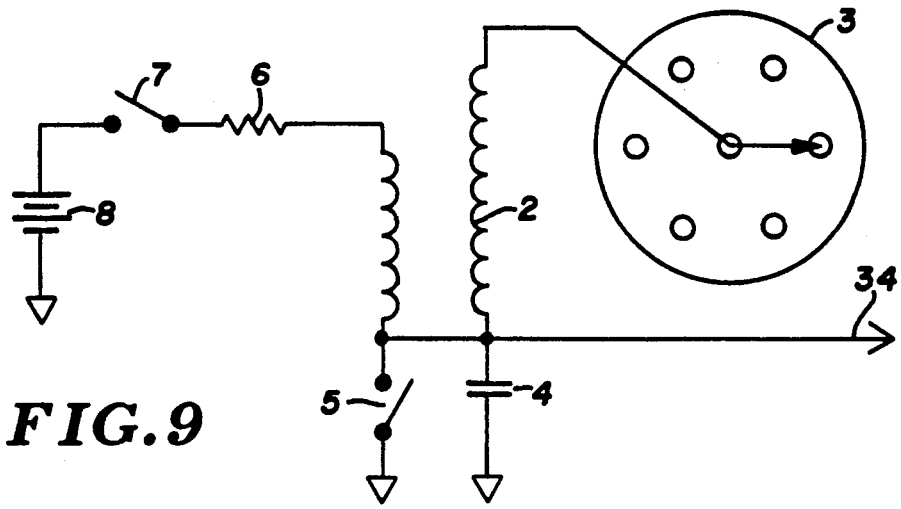
FIG. 9 is a circuit diagram of the vehicle ignition circuit and monitor connection.

A typical attachment from the engine to monitor 10 is through connection 34, shown in FIG. 9. Ignition coil 2 has the high voltage end attached to the center of rotor 3 and the center tap connection point 34 for monitor 10 also connected to parallelled condenser 4 and breaker points 5. The opposite ends of condenser 4 and breaker points 5 are grounded. The opposite end of ignition coil 2 is connected to ballast resistor 6. The opposite end of resistor 6 is connected to vehicle ignition switch 7. The other terminal of switch 7 is connected to the positive end of vehicle battery 8 with the negative end being grounded. Some ignition systems use a solid state switch rather than breaker points 8, however monitor 10 functons in the same manner.

Figure 2:
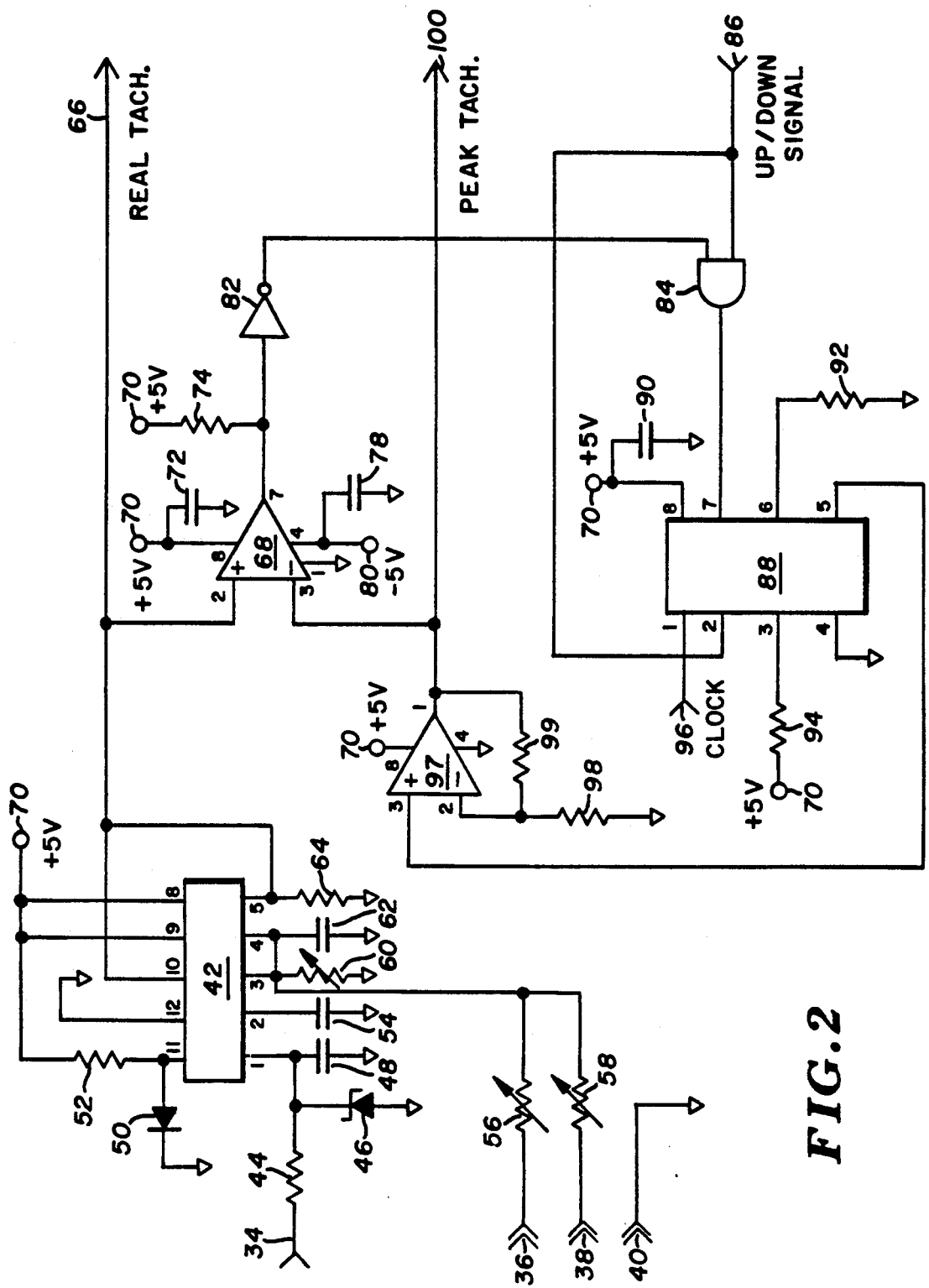
FIG. 2 is a circuit diagram of the engine rpm real and peak monitoring equipment.

The circuitry which provides the outputs of tachometer channel 18 and tachometer peak channel 26 are shown in FIG. 2. Point 34 is electrically connected to the center tap of ignition coil 2 as shown in FIG. 9. An electrical voltage pulse will appear at point 34 each time that ignition coil 2 fires a spark plug. If the engine has six cylinders with six spark plugs, as illustrated, then point 36 is connected to ground point 40. If the engine has eight cylinders with eight spark plugs then point 38 is connected to ground point 40. If the engine has four cylinders then neither point 36 or 38 are grounded. These connections in conjunction with adjustable resistors, to be described later, provides the proper scaling factor for the number of firings per revolution for each given number of cylinders.

Frequency to voltage converter type LM 2907 chip 42 converts an input frequency to a direct current voltage output. The connections to chip 42 follow. Resistor 44, with a value of 1 kilohms, is connected between input connection point 34 and input pin 1. Zener diode 46, type 1N5259 rated at 4.3 volts, and capacitor 48, with a value of 0.01 microfarads, are connected between pin 1 and ground.

Type 1N4148, diode 50, has the cathode grounded and the anode connected to pin 11, the invertor input pin. Resistor 52, with a value of 10 kilohms, is connected from pin 11 to both pins 9, 8 and connector 70. Pin 12 is grounded.

Capacitor 54, with a value of 0.01 microfarads, is connected between pin 2 and ground. Variable resistor 56, with a value of 100 kilohms, is connected from point 36 to pin 3 and variable resistor 58, with a value of 100 kilohms, is connected from point 38 to pin 3 of chip 42. Connector point 40 is grounded. Variable resistor 60, with a value of 100 kilohms, is connected from pin 3 of chip 42 to ground. Pin 3 is connected to pin 4 and capacitor 62, with a value of 1 microfarad, is connected from pin 4 to ground.

Resistor 64, with a value of 10 kilohms, is connected from pin 5 to ground with pin 5 also connected to pin 10 which is connection point 66 for the real tachometer output.

The values of the various components connected to chip 42 and the circuitry are arranged such that the input from connection point 34, 36 or 38, as appropriate, will provide a direct current output voltage at connection point 66, which is a linear function of the frequency of the input.

Resistor 60 is adjusted to provide the scaling factor for a four cylinder engine, resistor 56 is adjusted to provide the scaling factor for a six cylinder engine, and resistor 58 is adjusted to provide the scaling factor for an eight cylinder engine. Connection point 66 corresponds to the output from tach channel 18 of FIG. 1.

Comparator type LM311 chip 68 has the following connections. Plus 5 volts from connector 70 is attached to pin 8. Connector 70 is the output of a power supply chip which will be described later. Filter capacitor 72, with a value of 0.01 microfarads, is connected between pin 8 of chip 68 and ground. Resistor 74, with a value of 10 Megohms, is connected from the plus five volts of connector 70 to output pin 7. Capacitor 78, with a value of 0.01 microfarads, is connected between pin 4 and ground.

Connection point 80, which is the output of a power supply chip of minus five volts, to be described later, is also connected to pin 4. Output pin 7 is also connected to the input of Schmidt trigger type 74C14 chip 82. Chip 82 is used here to invert the input, with the output being connected to one of the inputs of type 4081 AND GATE 84. Connection 86 provides an UP-DOWN control signal, to be described later, as the second input of AND GATE chip 84, and also as an input to the UP-DOWN control pin 2 of digital potentiometer type X9103 chip 88.

The output of AND GATE chip 84 is connected to chip select pin 7 of chip 88. The connections to chip 88 follow. Plus five volts from connection 70 is connected to V-cc pin 8 and decoupling capacitor 90, with a value of 0.01 microfarads, is connected from pin 8 to ground. Resistor 92, with a value of 9.09 kilohms, is connected from VL pin 6 to ground. Ground pin 4 is connected to ground. Resistor 94, with a value of 165 kilohms, is connected from plus five volts connection 70 to Vh pin 3. Connection point 96 is connected from a memory clock signal, which will be described later, to INC pin 1 of chip 88.

Wiper pin 5 of chip 88 is connected to pin 3, which is the non-inverting input pin of a first half of dual operational amplifier 97 of a type LM 358 chip. Resistor 98, which has a value of 10 kilohms, is connected between pin 2, the inverting input of amplifier 97 and ground. Resistor 99, which has a value of 10 kilohms, is connected between pin 2 and pin 1 the output pin of amplifier 97. Output pin 1 of amplifier 97 is also connected to pin 3, the negative input of comparator chip 68, which also provides peak connection point 100. Plus 5 volts on connector 70 is connected to V plus pin 8. Connection point 100 also corresponds to the output from tachometer peak 26 block of FIG. 1.

The values for the components of the above described chips of FIG. 1 provide a normal operating mode for the respective chips. The operation of the tachometer channel begins at connector 34 where the tachometer input, which is taken from the low side of the ignition coil described earlier, is converted into a direct current voltage by chip 42, the frequency to voltage converter. If the engine being monitored has six cylinders then point 3 is grounded to point 40, if the engine has eight cylinders then point 38 is grounded to point 40, and if the engine has four cylinders then neither point 36 or 38 are grounded. Resistors 56, 58, and 60 provide means to calibrate the output with a proper scaling factor for the number of input pulses per engine revolution for different numbers of cylinders.

Connection point 66, the output of chip 42, is the direct current voltage derived from the pulses from the ignition coil and is also compared with the output voltage from chip 97. If the voltage from chip 42, the real tachometer voltage, is less than the output voltage from chip 97, the peak or maximum stored value of the real voltage, a negative voltage will be output from comparator chip 68 and be inverted by Schmidt trigger chip 82 to provide a positive input voltage to AND GATE 84 which is a high or 1 input to AND-GATE chip 84.

The up-down control signal at point 86 is always high after a timed power-up interval, which will be described later. The up-down control signal on connector 86 is connected to the second input of AND GATE chip 8 and the up-down control pin 2 of chip 88. When pin 2 and chip select pin 7 are both high, this will cause the operation of chip 88 to stop.

Chip select pin 7 is used here as a control means, since the chip will operate only when selected. One low input into AND GATE chip 84 will result in a low output from the chip to control chip CS pin of digital potentiometer chip 88 to turn the chip operation on. This results in output pin 5 being incremented in a positive direction for each memory clock input from connection 96 into INC pin 1. The memory clock circuit to connection 96 will be described later.

Digital potentiometer chip 88 has 99 steps to cover its voltage range and covers the center of the voltage range of the real time output from chip 42. Resistors 92 and 94 offset and limit the output of digital potentiometer chip 88 to a central range of values which cover the range of interest.

This closed loop from comparator chip 68, Schmidt trigger chip 82, and-gate chip 84, digital potentiometer chip 88, and amplifier chip 97 is arranged to drive the output voltage of digital potentiometer chip 88 and operational amplifier chip 97 in a positive direction, after the timed power-up interval, until comparator chip 68 indicates that the two are equal. When this occurs the output from comparator chip 68 goes low, the output from Schmidt trigger chip 82 goes high, the output from and-gate chip 84 goes high and digital potentiometer chip 88 will be stopped from incrementing upward. This results in the output of chip 97 being incremented upward by potentiometer chip 88 until the output on connector 100 is equal to the maximum output of connector 66 and effectively "remembers" the peak or maximum voltage output from chip 42. This output of chip 97 on connection point 100 corresponds to the output of tach. peak memory 26 in FIG. 1.

Since the closed loop is set up such that digital potentiometer chip 88 can normally only be incremented upward to a more positive voltage, the chip must be set to its lowest value initially. This reset mechanism is provided by setting the up-down control signal on connector 86 low or down during the initial power-up interval for a sufficient length of time to insure that digital potentiometer chip 88 will be incremented downward at least 99 steps so output pin 5 will always begin at its lowest value. When the up-down control signal on connector 86 is low this will set the up-down control pin 2 of potentiometer chip 88 to decrement the output voltage. This reset mechanism insures that the loop must always drive the output of chip 88 positive in order to track the maximum value of the input voltage. The means for setting the up-down control signal on connector 86 low for an adequate length of time during power-on to insure that all the digital potentiometers are reset to zero will be described later.

Figure 3:
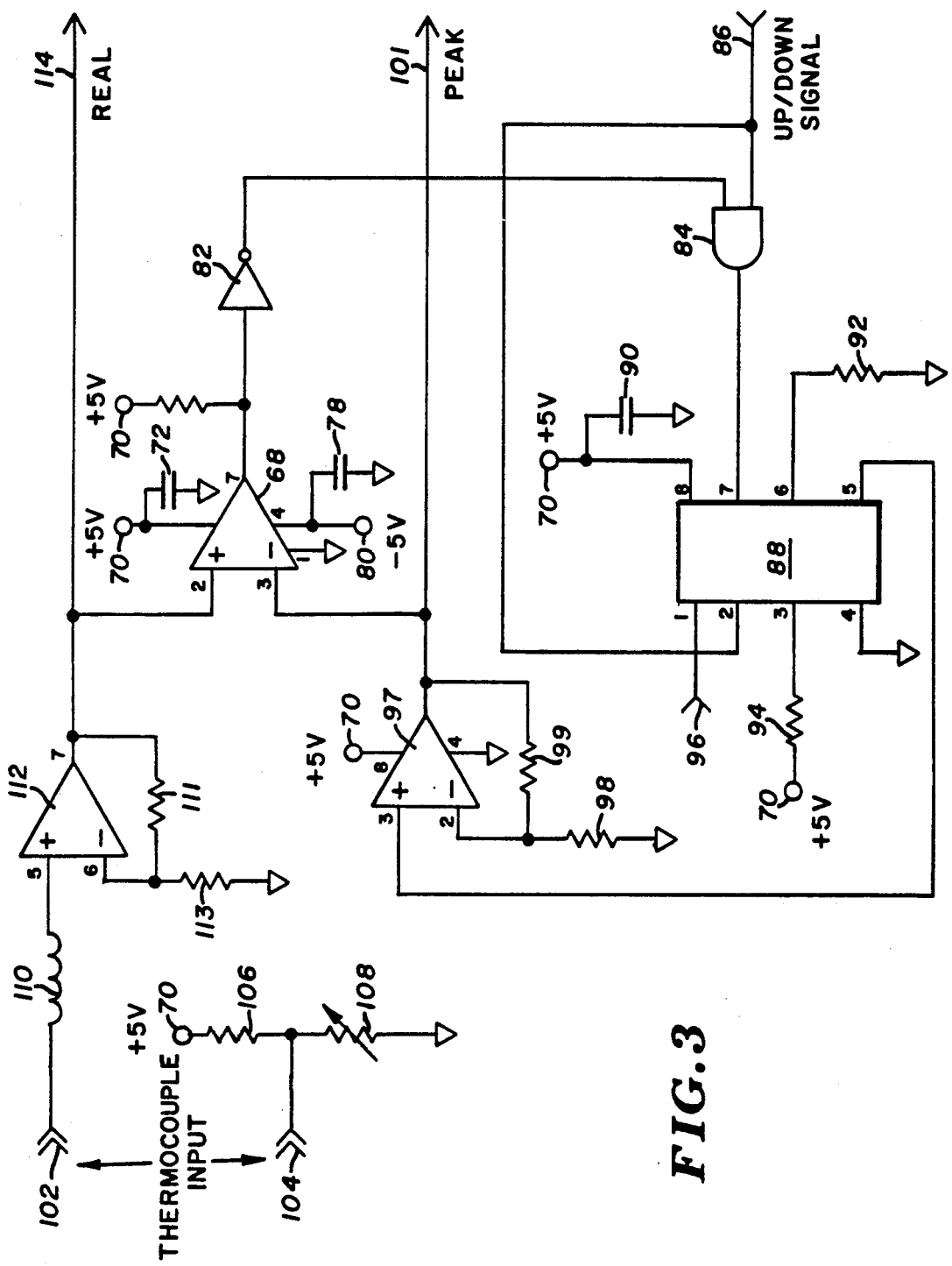
FIG. 3 is a circuit diagram of the engine temperature real and peak monitoring equipment.

In FIG. 3, the temperature channel and temperature peak memory channel circuits are shown. Chips 68, 82, 84, 88, 97 and their associated components and connections are the same as for the tachometer circuit of FIG. 2. Only the input circuitry to the positive input at pin 2 of comparator chip 68 is different. In this circuit a direct current voltage from a thermocouple is connected between connection points 102 and 104. Resistor 106, with a value of 200 kilohms, is connected from plus five volts of connection point 70 to connection point 104, and variable resistor 108, having a maximum value of 100 ohms, is connected from connection point 104 to ground. Variable resistor 108 provides an offset for the thermocouple input voltage providing engine temperature information. This offset permits limiting the temperature scale to the range of interest by resistors 94 and 92.

Choke 110, with a value of 100 microhenries, is connected from thermocouple input point 102 to pin 5, the non-inverting input, of amplifier 112, which is one-half of a dual operational amplifier type LM 358 chip. Resistor 111, with a value of 4.22 kilohms, is connected between inverting input pin 6 and output pin 7, and resistor 113, with a value of 100 ohms, is connected from pin 6 to ground. Output pin 7 of chip 112 is attached to connector 114 which provides the real time temperature output and also provides the input to pin 2 of comparator chip 68. This output from chip 112 provides a direct current voltage which corresponds to the real time outputs from the temperature channels in FIG. 3. The output from amplifier chip 97 is connected to connector 101 to provide the peak output of the temperatures which corresponds to the peak temperature outputs of FIG. 1. The operation of the circuit in FIG. 3, excepting for this input circuitry, is identical to that described for FIG. 2.

Separate circuits, identical to that of FIG. 3, are provided for real time temperature channel two 22, temperature two peak memory 30, real time temperature channel three 24, and temperature three peak memory 32. To distinguish between these identical separate circuits, the three temperature channels will be designated: channel one real time temperature output connector 114A, peak temperature one output connector 101A, channel two real time temperature output connector 114B, peak temperature two output connector 101B, channel three real time temperature output connector 114C, and peak temperature three output connector 101C. These three channels provide any desired three of the temperatures listed earlier.

Figure 4:
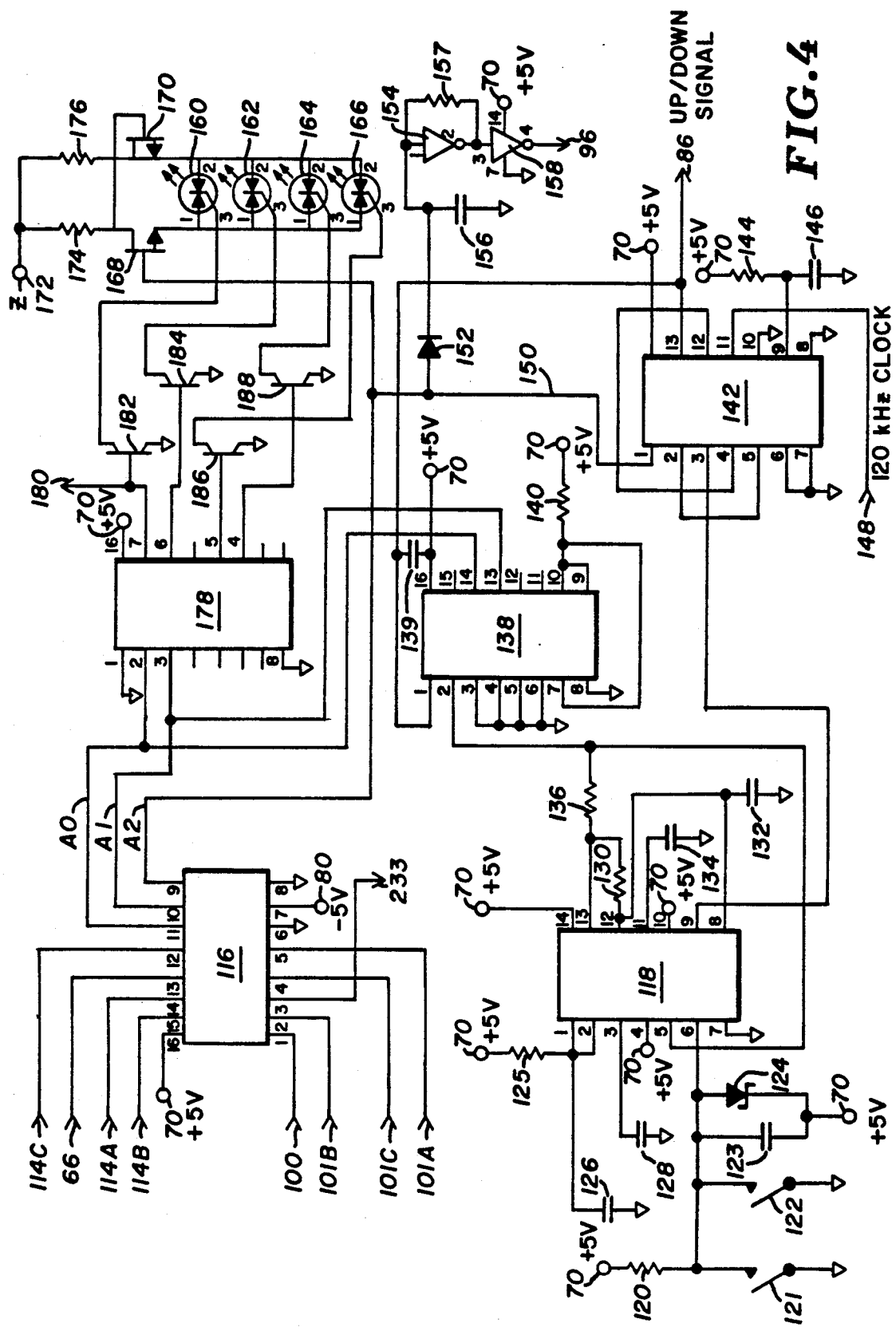
FIG. 4 is a circuit diagram of the switch with momentary and timed response circuits, multiplexer, control circuitry, 120 kilohertz clock,, diode driver circuitry and indicators.
Figure 7:
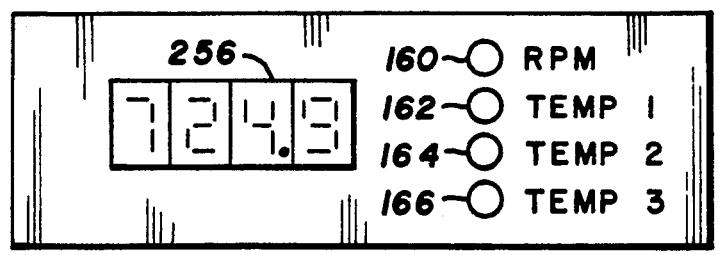
FIG. 7 is a front view of the control panel.

In FIG. 4 these circuits provide the multiplexer 16, shown in block diagram in FIG. 1, the control circuits, numeric display and indicator lights, also shown in FIG. 7, indicating which quantity is being displayed.

Connections to eight channel multiplexer type 4051 chip 116 follow. The real time tachometer input on connector 66 is connected to input pin 13, peak tachometer memory connector 100 is connected to input pin 1, real time temperature one connector 114A is connected to input pin 14, peak temperature one connector 101A is connected to input pin 5, real time temperature two connector 114B is connected to input pin 15, peak temperature two connector 101B is connected to input pin 2, real time temperature three connector 114C is connected to input pin 12 and peak temperature three connector 101C is connected to input pin 4. Plus 5 volts from connector 70 is connected to V-dd pin 16 and minus 5 volts from connector 80 is connected to V-ee pin 7. Pins 6 and 8 are grounded. With these connections multiplexer chip 116 will select one of these eight inputs to pins 1, 2, 3, 4, 12, 13, 14, or 15 depending upon the state of address lines A0, A1 and A2 on pins 11, 10, and 9 respectively.

Dual timer type LM 556 chip 118 has one timer section which controls address lines A0 and A1 and another timer which controls address line A2 of multiplexer chip 116 to select an input quantity, which will be described later. The first timer section of dual timer chip 118 is connected to pins 1 through 7 and the second timer section is connected to pins 8 through 14.

The following are chip 118 connections. Resistor 120, with a value of 100 kilohms, is connected from the plus 5 volts of connector 70 to trigger pin 6. Momentary contact spring loaded push button switches 121 and 122, are both connected in parallel from pin 6 to ground. Type 1N4734 zener diode 124, with an inverse voltage rating of 5.6 volts, and capacitor 123, with a value of 0.1 microfarads, are both connected in parallel from pin 6 to plus 5 volts on connector 70. Resistor 125, with a value of 2.2 Megohms, is connected between plus 5 volts on connector 70 and discharge pin 1.

Pin 1 is connected to threshold pin 2 and capacitor 126, with a value of 0.1 microfarads, is connected between connected pins 1 and 2 to ground. Capacitor 128, with a value of 0.01 microfarads, is connected between control voltage pin 3 and ground. Plus 5 volts on connector 70 is connected to reset pin 4. Ground pin 7 is connected to ground. Plus 5 volts on connector 70 is connected to V-cc pin 14. Resistor 130, with a value of 221 kilohms, is connected between discharge pin 13 and threshold pin 12. Pin 12 is also connected to trigger pin 8, and capacitor 132, with a value of 1.5 microfarads, is connected from pin 8 to ground. Capacitor 134, with a value of 0.01 microfarads, is connected between control voltage pin 11 and ground. Plus 5 volts on connector 70 is connected to reset pin 10. Resistor 136 with a value of 1.3 megohms is connected between discharge pin 13 and output pin 5.

The above values are selected such that when either spring loaded switch 121 or 122 are closed, even momentarily, trigger pin 6 will change state from low to high on the first timer section to cause an output to appear on line 5. When the switch is opened, the plus 5 volts on pin 4 will immediately reset the timer output to zero ready for the next cycle.

The second timer section of dual timer chip 118 is triggered by a positive going signal on trigger pin 8. The output from the first timer section on pin 5 is coupled through resistors 136 and 130 to trigger pin 8, which in conjunction with capacitor 132 to ground constitutes an R-C time delay circuit. When pin 5 is held high by a switch for approximately four seconds, the voltage on pin 8 will rise to a level sufficient to trigger the second timer section and give an output on second timer output pin 9. When the output on pin 5 goes low, this will allow capacitor 132 to discharge the voltage on capacitor 132 on pin 9 to the ground on pin 8 to reset the timer.

Because of this time delay, either switch 121 or 122 must be held closed for approximately 4 seconds to obtain an output on pin 9. This provides a dual control capability using only the operation of one switch, in that if either switch is closed momentarily, then only the first timer will be triggered, to give an output on the first timer output pin 5, whereas if either switch is held closed for at least 4 seconds, then the second timer section will also fire, to provide a second timer output on pin 9.

The use of the control provided by the output on pin 5 from the first timer of chip 118 will be described first. Pin 5 of chip 118 is connected to clock pin 2 of binary counter type 74C161 chip 138. Other chip 138 connections follow. IN-A, IN-B, IN-C and IN-D, on pins 3, 4, 5 and 6 respectively are grounded. Capacitor 139, having a value of 0.01 microfarads, is also connected from pin 1 to V dd pin 16. Plus 5 volts on connector 70 is also connected to pin 16. The least significant output bit Q-a is on pin 14 and the next significant bit Q-b is on pin 13. There are no connections to ripple carry pin 15, Qc pin 12, and Qd pin 11. Resistor 140, with a value of 100 kilohms, is connected between plus 5 volts on connector 70 and enable pin 10. Pin 10 is connected to both load pin 9 and enable pin 7.

With these connections and component values for four binary counter chip 138, every time clock pin 2 goes high the binary counter chip will increment upward. Of this four bit counter, pin 14 is the most significant bit and pin 13 is the next most significant bit. With this arrangement when the count on pins 13 and 14 reaches binary 11 the next count will automatically set both bits to zero. Whenever clear pin 1 is high the counter will also be reset to zero. Pins 13 and 14 provide address information used to control multiplex chip 116, which will be described later.

The first flip-flop of dual D flip-flop type CD4013BC chip 142 utilizes the output on pin 9 from the second timer of chip 118 to control the third most significant bit address line A2 for chip 116. The other flip-flop of chip 142 provides the up-down control signal for the digital potentiometers on pin 13 attached to connector 86. The connections for chip 142 follow. Pins 1 through 6 are connected to the first flip-flop and pins 8 through 13 are connected to the second flip-flop. Pin 1 is the Q1 output and pin 2 is the Q1 bar output. Pin 3 is the clock 1 input and pin 4 is the first flip-flop reset pin. The first flip-flop has data line pin 5, and set pin 6. Pin 7 is the Vss voltage line.

Q1 on pin 1 is tied to connector 150, which provides an A2 address line and an indication of whether the quantity being displayed is a real or a peak quantity. Q1 bar on pin 2 is connected to data 1 pin 5 to set the Q1 output to the inverse of Q1 bar. Pin 9, the output of the second timer of timer chip 118, is connected to clock pin 3 of the first flip-flop of chip 142. With these connections, whenever timer pin 9 of chip 118 goes positive the first flip-flop of chip 142 will be clocked. Reset pin 4 of flip-flop chip 142 is connected to pin 12 which is Q2 bar of the second flip-flop. This permits the second flip-flop of chip 142 to reset flip-flop one. This purpose of this will be covered later. Set pin 6 and V-ss pin 7 are grounded.

The connections to the second flip-flop of chip 142 follow. Set pin 8, data pin 9, reset pin 10, clock pin 11, Q2 bar pin 12, and Q2 pin 13. The V-dd pin 14 is connected to plus 5 volts on connector 70.

Resistor 144, having a value of 75 kilohms, is connected between plus 5 volts on connection 70 and data pin 9. Capacitor 146, having a value of 100 microfarads, is connected between pin 9 and ground. Pins 8 and 10 are grounded. A 120 kilohertz clock signal on connector 148 is connected to clock pin 11. The generation of this clock signal will be described later.

When the power is off capacitor 146 will discharge providing zero volts to data pin 9. In the first instant of power-on this voltage on data pin 9 will drive the Q output pin 13 to low or zero, which is the "down" command on connector 86 to all the digital potentiometers. Immediately after power-up capacitor 146 will begin charging from the plus 5 volts on connector 70 through resistor 144, and when the charge reaches a value of about 3 volts this will cause the state of pin 13 to change to high, the "up" control signal of connector 86. The time constants of resistor 144 and capacitor 146 are such that this will take between four and five seconds to occur.

The digital potentiometer memory clock frequency on connector 96 is between 40 and 50 hertz. Since the digital potentiometers have 99 steps this assures that all potentiometers will be decremented between 160 and 250 steps which exceeds the 99 steps necessary to decrement the potentiometers to zero during this timed power-up interval. Once data pin 9 has been driven high the control signal on pin 13 and connector 86 will go high and will remain high until power down, consequently the digital pots 88 will only increment upwards after the initial timed power-up interval.

As described earlier, output pin 9 of dual timer chip 118 will only switch high after switch 121 or 122 have been held on for more than 4 seconds. With pin 9 of dual timer chip 118 being connected to clock pin 3 of the first flip-flop of chip 142, and with the described connections and component values the flip-flop will toggle each time that pin 9 of chip 118 goes positive. On power-up, during the 4 to 5 second interval that data pin 9 of chip 142 is low, the Q bar output on pin 12 will go high, and since this is connected to reset pin 4, the first flip-flop will be reset. Q output pin 1 of flip-flop one is connected to connector 150 and is therefore set low during power-up. Connector 150 provides the third address line A2 for multiplexer chip 116 and an indication of whether the signal being read is real or peak, as will be described later.

Type 1N4148 diode 152, is connected between connector 150 and input pin 1 of type 74C14 Hex Schmidt Trigger chip having one section used here as a first invertor 154. The cathode end of diode 152 is also attached to input pin 1 of invertor 154. A capacitor 156, with a value of 10 microfarads, is attached between ground and pin 1 of invertor 154. A resistor 157, with a value of 5 kilohms, is connected from output pin 2 of first invertor 154 to input pin 3 of invertor 158, another section of Schmidt Trigger of type 74C14 Hex chip used here as an invertor. These components around invertor 156 form an oscillator with a frequency of between 40 and 50 hertz. The output of invertor 154 is connected to input pin 3 of invertor 158. The output of the second invertor 158 on pin 4 is connected to connector 96 to provide the digital pot memory clock to clock all of the digital potentiometers at that frequency. Chip 74C14 has pin 7 grounded and plus 5 volts from connector 70 to Vcc pin 14.

Whenever connector 150 is low diode 152 will not conduct which will permit invertor chip 154 to oscillate. When connector 150 is driven high, then diode 152 will conduct to prevent invertor chip 154 from oscillating. Conductor 150 is driven high whenever a stored quantity is being read to prevent any stored values from changing during read out by stopping the clock signal to all of the digital potentiometers, which here provides: the increment control signal.

As discussed earlier, connector 150 is connected to the most significant bit on pin 9 of eight channel multiplexer chip 116, also labeled A2. When connector 150 to pin 9 is low, chip 116 will select one of pins 12, 13, 14 or 15 the real inputs, as determined by the state of pins 10 and 9. When connector 150 is high, chip 116 will select one of pins 1, 2, 4 or the stored peak quantities, again determined by the state of pins 10 and 9.

After power-up, output pin 9 of dual timer chip 118 will switch high only when either switch 121 or 122 is held closed for four or more seconds, which will toggle the state of pin 1 of chip 142, the A2 address line, and either a momentary or an extended closure of either switch will cause an output from pin 5 of chip 118, which will cause chip 138 to increment the binary count of pins 13 and 14, the A0 and A1 address lines. Therefore either switch 121 or 122 controls all three of the address lines into pins 9, 10, and 11 of multiplexer chip 116. If the operator wants to change from a real time to a stored peak quantity either switch is held closed for four seconds or more. If the operator wants to read through all those quantities, then either switch is only closed momentarily. While the quantity being read will always switch whenever the real or peak quantity reading mode is toggled by a four second switch closure, the quantity being read is also indicated, as will be described later, to permit the operator to select the read quantity separately, by a momentary closure of either switch, after the real or peak reading mode has been selected.

Note that when the previous state of Q output pin 1, address line A2 is high, then a clock input on pin 3 will toggle the pin to a low state and vice versa. Since Q output pin 1 on chip 142 is always set to low on power-up, connector 150 will always be low initially so the real quantities will always be read and there will always be a digital pot memory clock signal on connector 96 after the power-up interval to clock the digital potentiometers to increment upward to the peak values during the run.

At the end of a run, connector 150 is set high manually by closing either switch 121 or 122 for four seconds or more to cause diode 152 to prevent invertor 154 from oscillating and stop the potentiometer clock inputs, so the peak memory values will being read with no further changes. This is important since after a run the engine is then under no load and the engine parameters will change considerably and quickly.

Connector 150, in addition to providing a control means for the digital pot memory clock and the most significant bit A2 for addressing multiplexer 116 also controls four dual colored light emitting diodes (LED) 160, 162, 164, and 166 by means of field effect transistors (FET) type BS170 168 and 170.

Connector 150 is attached to the gate of FET 168. A plus voltage from connection Z of 12 volts on connector 172 is connected to resistors 174 and 176, each having a value of 1 kilohm. The opposite end of resistor 174 is attached to the drain of FET 168 and the opposite end of resistor 176 is attached to the drain of FET 170. The drain of FET 168 is also attached to the gate of FET 170. The source of FET 16 is attached to the anode lead 1 of dual diodes 160, 162, 164 and 166. The source of FET 170 is attached to the anode lead 2 of dual diodes 160, 162, 164, and 166.

When connector 150 is low then the gate of FET 168 will be low, which will turn off the FET and drive its source high, and since the source is connected to the gate of FET 170, this will turn the FET on and provide a positive voltage to the anode leads 2 of LED 160, 162, 164, and 166. Anode leads 2 will energize the green color diode portion of the dual diodes. Conversely when connector 150 is high FET 168 is on, which provides a positive voltage to the anode leads 1 of LED 160, 162, 164 and 166, since FET 170 is now turned off this will block the voltage to the diode leads 2. Anode leads 1 will energize the red color diode portion of the dual diodes.

The two address lines on pin 14 on pin 13 of binary counter chip 138 are also connected to pins 2 and 3 respectively of a binary to one of four decoder demultiplexer type 4555 chip 178. Other connections of chip 178 follow. Pins 1 and 8 are connected to ground. Pin 16 is connected to plus 5 volts of connector 70. With these connections on chip 178, pins 7, 6, 5 or 4 will be selected depending upon the states of pins 2 and 3. Pin 7 is also connected to connector 180 to provide a decimal point indication for the display which will be described later.

Field effect transistors (FET) 182, 184, 186 and 188 are type BS170. The drain of FET 182 is connected to the common cathode connection 3 of LED 160, the source is connected to ground and the gate is connected to pin 7 of chip 178. The drain of FET 184 is connected to the common cathode connection 3 of LED 162, the source is connected to ground and the gate is connected to pin 6 of chip 178. The drain of FET 186 is connected to the common cathode connection 3 of LED 164, the source is connected to ground and the gate is connected to pin 5 of chip 178. The drain of FET 188 is connected to the common cathode connection 3 of LED 166, the source is connected to ground and the gate is connected to pin 4 of chip 178.

With these connections whenever either any one output pin 4, 5, 6, or 7 of chip 178 is high then a conducting path for the common anode 3 of LED 164, 166, 162, or 160 respectively is provided. If connector 150 is low then FET 170 is on and a positive voltage is provided to the anode leads 2 of LEDs 160, 162, 164, and 166. This will cause the green diode indicator of whichever diode cathode lead has a low output pin to light. Conversely, if connection 150 is high then FET 168 is on and a positive voltage is provided to the anode leads 1 of LEDs 160, 162, 164 and 166. This will cause the red diode indicator of whichever diode cathode lead has a low output pin to light.

Diodes 160, 162, 164, and 166 are mounted adjacent to the display and labeled adjacent to the diode the quantity shown when that diode is lighted. This is shown in FIG. 7 where diodes 160, 162, 164, and 166 have the diodes labeled as to the quantity displayed when that diode is lighted, while the red portion of the diode is lighted when the quantity displayed is a peak, or stored, quantity and the green portion is lighted when the quantity displayed is a real, or current, quantity.

Figure 6:
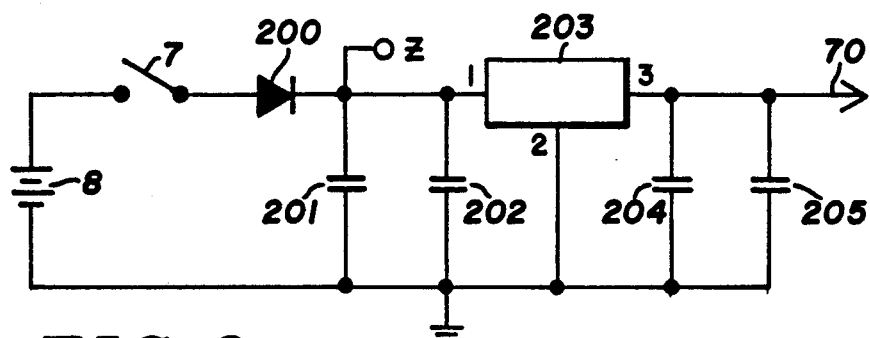
FIG. 6 is a circuit diagram of the plus 5 volt power supply.

The power supply for the system is shown in FIG. 6. Vehicle battery 8 of 12 volts with the negative side grounded has the positive side connected through the ignition or an auxiliary switch 7 to the anode of type 1N4002 diode 200. The cathode of diode 200 is connected to parallelled capacitors 201, with a value of 33 microfarads and 202 with a value of 0.1 microfarads, and to the input connector 1 of type LM 7805 voltage regulator 203. The opposite ends of capacitors 201 and 202 are grounded. Ground pin 2 of regulator 203 is grounded and output pin 3 is connected to parallelled capacitors 204, with a value of 0.01 microfarads and 205, with a value of 100 microfarads, and to plus five voltage connector 70. The opposite ends of capacitors 204 and 205 are grounded. Connector 760 supplies the plus 5 voltage for the monitor system.

Figure 5:
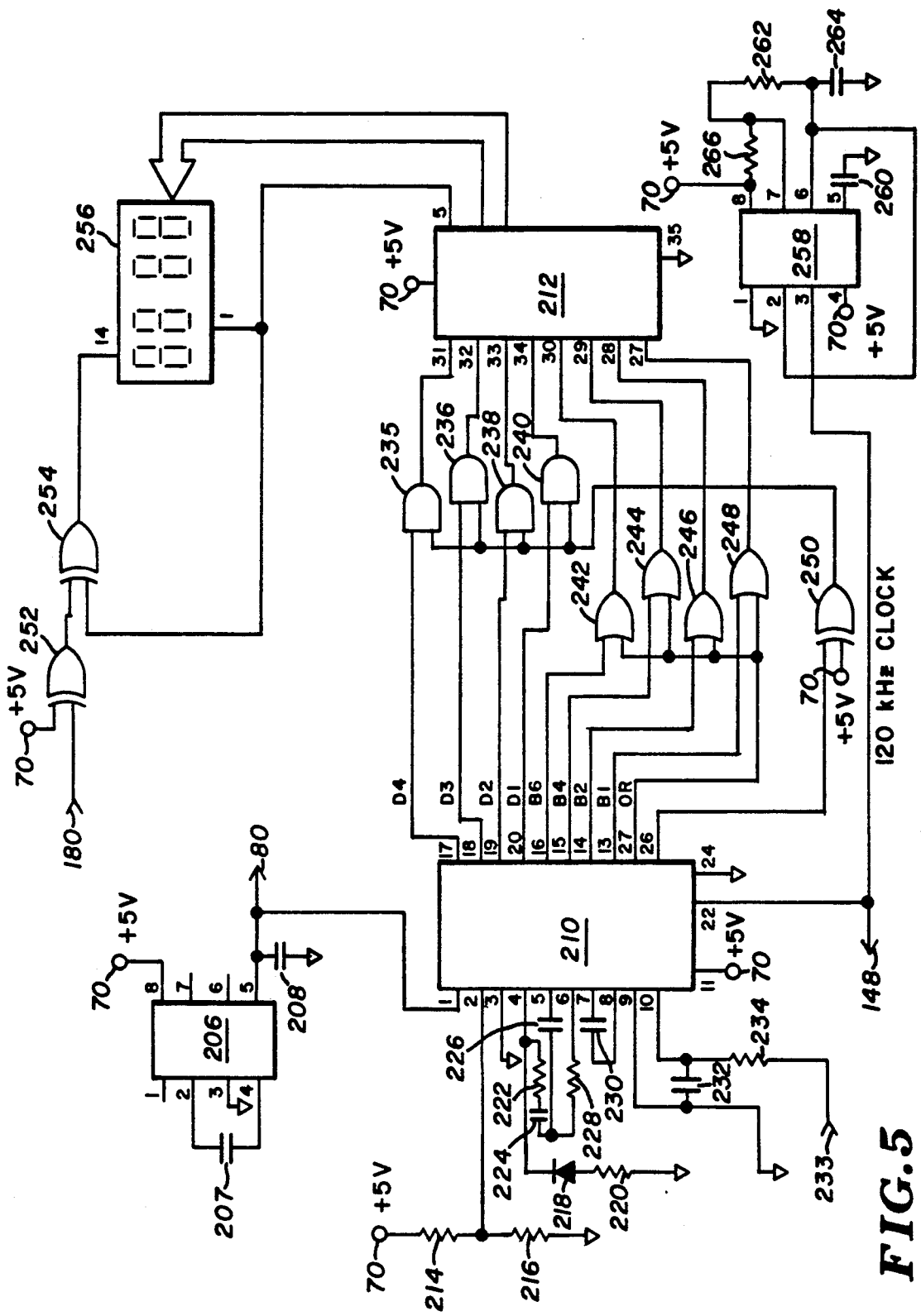
FIG. 5 is a circuit diagram of the minus 5 volt power supply, the analog to digital converter, control logic and driver circuit for the digital display.

Referring to FIG. 5 shows a monolithic voltage converter type 1CL7660 chip 206 with the plus 5 volt connector 70 attached to pin 8. Pin 3 is grounded and capacitor 207 with a value of 10 microfarads is connected across pins 2 and 4. Capacitor 208, with a value of 100 microfarads, is connected from pin 5, the minus 5 volt output pin of chip 206 to ground. Pin 5 is also connected to connector 80 the minus 5 volts supply for the system.

An analog to digital type ICL 7135 chip 210 converts an analog voltage on pin 10 to multiplexed binary coded decimal outputs B1, B2, B4, and B8 on pins 13, 14, 15 and 16 respectively. These outputs and outputs D1, D2, D3, and D4 on pins 20, 19, 18 and 17 respectively are designed to function with four digit display driver type 7211 chip 212.

The connections to chip 210 follow. Minus 5 volts on connector 80 is connected to minus voltage pin 1. Resistor 214, with a value of 200 kilohms, is connected between plus 5 volts on connector 70 to reference pin 2. Resistor 216 with a value of 49.9 kilohms is connected between pin 2 and ground. Analog common pin 3 is grounded. The cathode end of type 1N4148 diode 218 is connected to INT out pin 4 and the anode end connected to resistor 220, with a value of 110 kilohms, with the opposite end of the resistor grounded. Resistor 222, with a value of 27 kilohms, is connected between INT out pin 4 and capacitor 224, with a value of 0.47 microfarads. The opposite end of capacitor 224 is connected to both capacitor 226, with a value of 1 microfarad, and to resistor 228 with a value of 100kilohms. Capacitor 226 is connected between capacitor 224 and AZ pin 5. Resistor 228 is connected between capacitor 224 and BUFF OUT pin 6. Capacitor 230 with a value of 1 microfarad is connected between reference capacitor minus pin 7 and reference capacitor plus pin 8. IN LO pin 9 is connected to ground. Capacitor 232, with a value of 0.1 microfarads is connected between pin 9 and IN Hi pin 10. Resistor 234, with a value of 10 kilohms, is connected between IN HIGH pin 10 of chip 210 and connector 233, which is connected to output pin 3 of multiplexer chip 116, shown in FIG. 4.

The voltage plus pin 11 is connected to plus 5 volt connector 70. Clock IN pin 22 is connected to connector 148 which provides a 120 kilohertz clock signal to chip 142. The generation of this clock signal will be described later. Digital ground pin 24 is connected to ground.

Quad AND gate chip type CD4081 B contains four AND gates 235, 236, and 238 and 240. A quad OR gate type CD4071B chip contains four OR gates 242, 244, 246 and 248. Quad exclusive OR gate chip type 4030 contains four EXCLUSIVE OR gates of which three EXCLUSIVE OR gates 250, 252 and 254 are used here.

D4 pin 17 of chip 210 is one input to AND gate 235. The output of AND gate 23 is connected to digit select input D1 pin 31 of display driver type 7211 chip 212. D3 pin 18 of chip 210 is an input to AND gate 236, which has the output connected to digital select input D2 pin 32 of chip 212. D2 pin 19 of chip 210 is an input to AND gate 238, which has the output connected to digital select input D3 pin 33 of chip 212. D1 pin 20 of chip 210 is an input to and gate 240, which has the output of connected to digital select input D4 pin 34 of chip 212. STROBE pin 26 of chip 210 is connected to one input of EXCLUSIVE OR gate 250. Plus 5 volts from connector 70 is connected to the other input of gate 250. The output of gate 250 provides the second strobe input to AND gates 235, 236, 238 and 240. B8 the most significant bit (MSB) on pin 16 of chip 210 is an input to OR gate 242, which has the output connected to B3 data input pin 30 of chip 212. B4 on pin 15 of chip 210 is an input to OR gate 244, which has the output connected to B2 data input pin 29 of chip 212. B2 on pin 14 of chip 210 is an input to OR gate 246, which has the output connected to B data input pin 28 of chip 212. B1 on pin 13 of chip 210 is an input to OR gate 248, which has the output connected to B0 pin 27 of chip 212. Pin 27 of chip 210 indicates overrange and provides the second input to OR gates 242, 244, 246 and 248 to suppress the output from these gates whenever there is an overrange.

With these connections, analog voltages impressed across input pins 9 and 10 of analog to digital converter chip 210 will be converted to a series of four binary coded decimal (BCD) outputs on pins 13, 14, 15 and 16. These BCD outputs will be strobed successively to display driver chip 212 by strobe signals on pin 26 which are clocked by the 120 Kilohertz clock input on pin 22.

Other connections to chip 212 follow. Plus 5 volts on connector 70 is connected to V* pin 1 and ground pin 35 is grounded. Chip 212 is designed to directly drive four decimal digit type FE0501 liquid crystal display (LCD) 256, or the equivalent. Type FE0501 LCD is a direct drive display with 0.7 inch high characters with four convention seven segments arranged in a FIG. 8 pattern to generate a four digit decimal display. In addition to connections to these four digit displays, a back plane terminal 5 and decimal point terminal (DPT) are also necessary.

Pin 5 of chip 212 is connected to terminal 1 of LCD 256 and the output pin of EXCLUSIVE OR gate 256 is connected to terminal 14 LCD 256. Plus 5 volts on connector 70 and connector 180 from chip 178, shown in FIG. 4, provides the two inputs to EXCLUSIVE OR gate 252, the output from gate 252 and from pin 5 of chip 212 provides the two inputs to gate 254. Connections, shown by a double-line, between chip 212 and LCD 256 are shown in tabular form below with the connections being between the chip pins and LCD shown on the same line. The LCD label is also shown on the same line.

CHIP 212 TO LCD 256 CONNECTION TABLE

| Chip 212 Pin No. | LCD 256 Terminal No. | Designation |
|---|---|---|
| 5 | 1 | Back plane |
| 2 | 5 | 4E |
| 40 | 6 | 4D |
| 39 | 7 | 4C |
| 10 | 9 | 3E |
| 9 | 10 | 3D |
| 8 | 11 | 3C |
| 17 | 13 | 2E |
| 16 | 14 | 2D |
| 15 | 15 | 2C |
| 24 | 18 | 1D |
| 22 | 19 | 1C |
| 21 | 20 | 1B |
| 20 | 21 | 1A |
| 26 | 22 | 1F |
| 25 | 23 | 1G |
| 14 | 24 | 2B |
| 13 | 25 | 2A |
| 19 | 26 | 2F |
| 18 | 27 | 2G |
| 7 | 29 | 3B |
| 6 | 30 | 3A |
| 12 | 31 | 3F |
| 11 | 32 | 3G |
| 38 | 34 | 4B |
| 37 | 35 | 4A |
| 4 | 36 | 4F |
| 3 | 37 | 4G |

Figure 8:
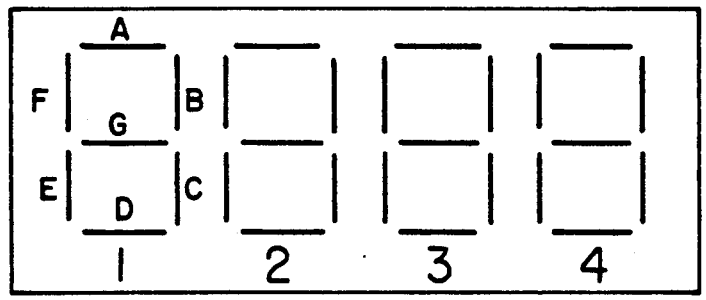
FIG. 8 is a pictorial diagram showing the digital display segment designations.

The physical relationship of the four digits and the seven segments, each indicated by a number and letter from the connection table are also shown in FIG. 8.

With these connections display driven chip 212 will sequentially drive the four columns of seven segments each in LCD 256 to form the four digit decimal number, which was converted by chip 210 from an analog voltage. The appropriate decimal point from connector 180 is also displayed on LCD 256.

The connections to type 555 timer chip 258 in FIG. 5 follow. Ground pin 1 is grounded. Trigger pin 2 is connected to threshold pin 6. Output pin 3 is connected to connector 148, the 120 kilohertz clock connector. Reset pin 4 is connected to plus 5 volts on connector 70. Capacitor 260, with a value of 0.01 microfarads, is connected between control voltage pin 5 and ground. Threshold pin 6 is connected to resister 262 with a value of 301 ohms, and capacitor 264 with a value of 0.01 microfarads. The opposite end of resister 262 is connected to discharge pin 7. The opposite end of capacitor 264 is grounded. Resistor 266, with a value of 374 ohms is connected from Vcc pin 8 to pin 7. Pin 8 is also connected to plus 5 volts on connection 70. With these connections and component values chip 258 will generate a clock signal of approximately 120 kilohertz on pin 3, which is connected to connector 148 for distribution to the other circuits.

This monitoring apparatus with the component values described above has a scale to read out the engine rpm between a minimum of 0000 and a maximum of 9999, and read out all of the temperatures in degrees fahrenheit between a minimum of 100.0 and a maximum of 400.0. On the block diagram of FIG. 1, the rpm is read out on TACH. CHANNEL 8, and TACH. PEAK MEMORY 26 is read out on TEMP. CHANNEL ONE 20 and TEMP. ONE. PEAK MEMORY 28 is read out on TEMP. CHANNEL TWO 22 and TEMP. TWO PEAK MEMORY 30 is read out on TEMP. CHANNEL THREE 24 AND TEMP THREE PEAK MEMORY 32. All that is required is that the appropriate terminals for the tachometer read out be grounded as was discussed in the description of FIG. 2.

This apparatus avoids the critical timing and programming complexities of other apparatus by eliminating the microprocessor as one of the elements. The logic circuitry used is clocked by relatively slow speed simple clock circuits with each clock selected for optimum timing. The use of a clock signal of only 40 to 50 hertz on the digital potentiometers, for example, is more than adequate to obtain the peak values of the slowly changing engine parameters as well as assure that the potentiometers will be reset to zero during the timed power-up interval.

An additional advantage, of eliminating the microprocessor and storing the peak values in parallel in analog form, is the fact that this eliminates any timing skew which occurs when signals are converted and stored sequentially in computer memory cells. The unique control approach which permits only one switch to select all of the input quantities as well as selecting whether these quantities are real or peak is very easy to use. This is important where the operator may also be driving the vehicle under test while reading these quantities.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

We claim:

1. Monitoring apparatus comprising:
  a) an operator controllable switch;
  b) a first control means for controlling electrical circuits having a first and a second state, being connected to said switch and arranged such that said first control means will toggle between the first and the second state whenever said switch is closed for a first time interval of a predetermined length; and
  c) a second control means for controlling electrical circuits having a first and a second state, being connected to said switch and arranged such that said second control means will toggle between the first and the second state whenever said switch is closed momentarily; and
  d) first circuit means for logic control having a first and second state, being connected to said first control means and being controlled thereby such that said first circuit means will have the same state as said first control means, and
  e) counting means for counting the changes of state of said second control means, said counting means being connected to said second control means and arranged such that the count will increment upward by one upon each change of state of said second control means to a predetermined maximum count and will reset to zero and begin a new count on the next subsequent change of state; and
  f) multiplexer means having multiple inputs and a single output for selecting one of the inputs as an output, having as inputs a first class and a second class of voltage inputs with the number of each class of inputs being equal to the maximum count of said counter means; and
  g) said multiplexer means inputs, said multiplexer means, said first circuit means and said counter means being connected and arranged such that when said first circuit means is in the first state the multiplexer means output will be selected from among the first class of multiplexer means input voltages, and when said first circuit means is in the second state the multiplexer means output will be selected from among the second class of multiplexer means input voltages, and such that the individual multiplexer output of the selected class of inputs will determined by the count of said counting means.

2. Monitoring apparatus comprising:
  a) an operator controllable switch;
  b) a first control means for controlling electrical circuits having a first and a second state, being connected to said switch and arranged such that said first control means will toggle between the first and the second state whenever said switch is closed for a first time interval of a predetermined length; and
  c) a second control means for controlling electrical circuits having a first and a second state, being connected to said switch and arranged such that said second control means will toggle between the first and the second state whenever said switch is closed momentarily; and
  d) counting means for counting the changes of state of said second control means, said counting means being connected to said second control means and arranged such that the count will increment upward by one upon each change of state of said second control means to a predetermined maximum count and will reset to zero and begin a new count on the next subsequent change of state; and
  e) a plurality of transducer means for converting engine parameters to direct current output voltages; and
  f) a plurality of analog voltage storage means for storing the maximum output voltages of each of the transducer means with the quantity of analog voltage storage means being equal in number to the number of transducer means; and
  g) multiplexer means having multiple inputs and a single output for selecting one of the inputs as an output, having as inputs the transducer means output voltages and the analog voltage storage means maximum output voltages; and
  h) said multiplexer means inputs, said multiplexer means and said first circuit control means being connected and arranged such that when said first circuit control means is in the first state the multiplexer means output will be selected from among the class of multiplexer means input voltages consisting of the transducer means output voltages, and when said first circuit control means is in the second state the multiplexer means output will be selected from among the class of multiplexer means input voltages consisting of the storage means maximum output voltages; and
  i) said counting means predetermined maximum count being equal to the number of transducer means, and with said counting means, said inputs to said multiplexer means, said multiplexer means and said first and second circuit control means being connected and arranged such that said counting means will select as the multiplexer means output a predetermined input which shall correspond to the counting means count, and such that the input selected by said counting means will also be from the class of inputs selected by the first circuit control means; and j) an analog to digital converter arranged to convert the multiplexer output voltage to digital numbers; and k) display means for displaying the analog to digital converter number.

3. Apparatus as in claim 2 wherein the analog voltage storage means further comprises:

a) digital potentiometer means having a number of discrete output steps for providing a direct current output voltage proportional to the step position, the steps having a predetermined size and being of a predetermined number;

b) said digital potentiometer means having stepping means for changing the digital potentiometer output voltage by changing the digital potentiometer step position;

c) comparator means for comparing the digital potentiometer means output voltage with an input voltage; and d) control logic means for controlling the digital potentiometer stepping means, said control logic means, said digital potentiometer means, said digital potentiometer stepping means, said comparator means, and said first and second control means being connected and arranged such that during a second time interval of a predetermined length occurring immediately after power up, said digital potentiometer stepping means will step at a predetermined step rate in a direction which will decrease the output voltage of said digital potentiometer, the second time interval being sufficient in length to allow the stepping means to step completely through all of the digital potentiometer means steps at the predetermined step rate from the maximum output voltage to the minimum output voltage, and such that after the second time interval after power up when the first circuit control means is in the first state, said digital potentiometer stepping means will step at the predetermined step rate in a direction which will increase the output voltage of said digital potentiometer whenever said comparator means also indicates that the digital potentiometer means output voltage is less than the compared input voltage, and such that after the second time interval after power up when the first circuit control means is in the second state, said digital potentiometer stepping means will halt at the current step position.

4. Apparatus as in claim 2 wherein said second control means comprises second timer means for changing the output state in timed response to the state of an input signal, said switch being connected to said second timer means such as to provide the input signal and being arranged such that the second timer means will toggle between the first and the second state whenever the switch is closed momentarily.

5. Apparatus as in claim 2 wherein said first control means comprises first timer means for changing the output state in timed response to the state of an input signal, and having time delay circuit means for providing a time delayed logic signal, said switch being connected to said first control means through said time delay circuit means such as to provide a time delayed input signal of the first time interval and toggle said first timer means between the first and the second state whenever said switch is held closed for the first time interval.

6. Apparatus as in claim 2 wherein said counting means comprises a binary counter chip having a binary output for the count output.

7. Apparatus as in claim 2 wherein at least one of said transducer means comprises tachometer means for determining engine revolutions per minute and providing a voltage output proportional thereto.

8. Apparatus as in claim 7 with the engine having a number of spark plugs and having ignition means for firing the spark plugs in proper sequence using electrical impulses, and wherein said tachometer means further comprises voltage converter means for converting the frequency of an electrical input signal into a direct current voltage, and has scale factor means for changing the scale factor of the voltage converter means depending upon the number of spark plugs, one of the spark plugs being connected to said voltage converter means through the scale factor means and arranged such as to convert the number of ignition impulses from the spark plug to a voltage converter means output voltage which is proportional to the number of engine revolutions per minute.

9. Apparatus as in claim 2 wherein said transducer means includes a number of thermocouple means for converting temperature into a direct current voltage.

10. Apparatus as in claim 2 further comprising light indicator means for indicating the multiplexer input selected as an output, the quantity of light indicator means being equal to the number of transducer means, each light indicator means having a first color light output and a second color light output, said light indicator means, said multiplexer inputs, said multiplexer means and said first and second control means being connected and arranged such that when said first control means is in the first state any selected light output will have the first color and when the first control means is in the second state any selected light output will have the second color, and further that only one light means shall have a light output which shall be predetermined and depend upon the counter means count.

11. Apparatus as in claim 2 wherein said display means has means for displaying a decimal point corresponding to the magnitude of the displayed number.

* * * * *